F. H. FARMER.
INTERNAL COMBUSTION ENGINE.
APPLICATION FILED NOV. 9, 1916.
1,230,470.
Patented June 19, 1917.
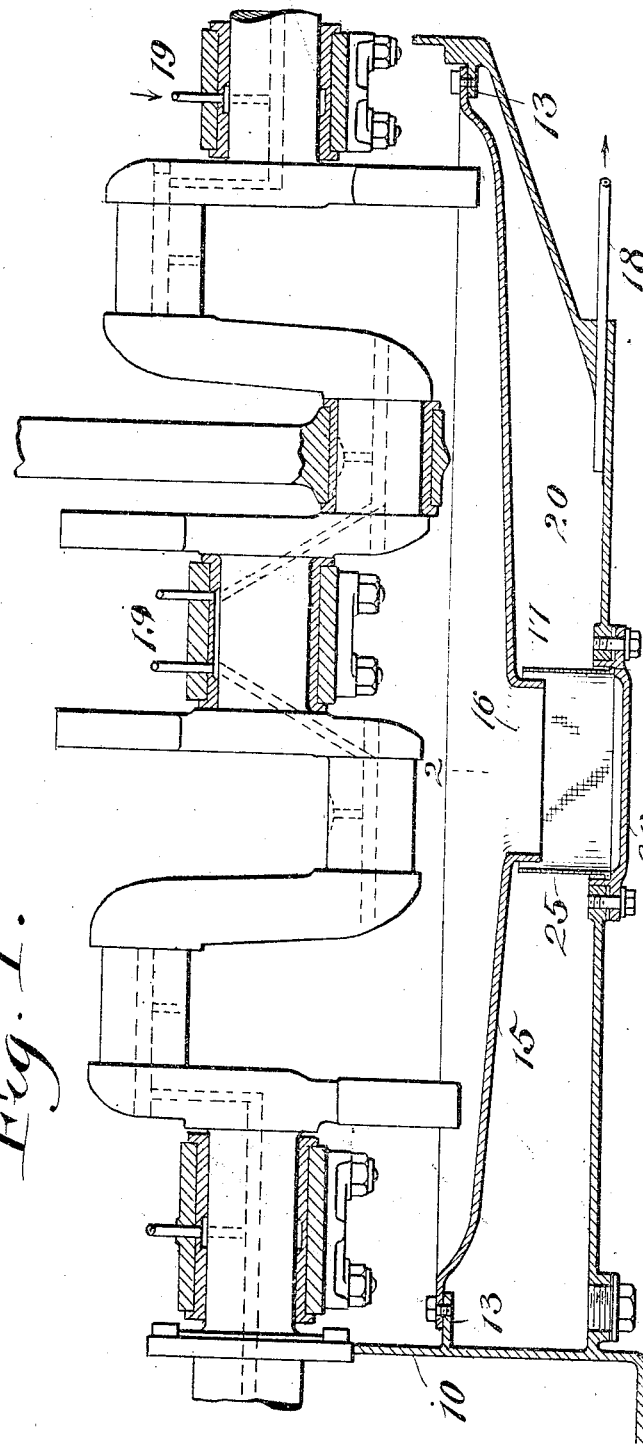
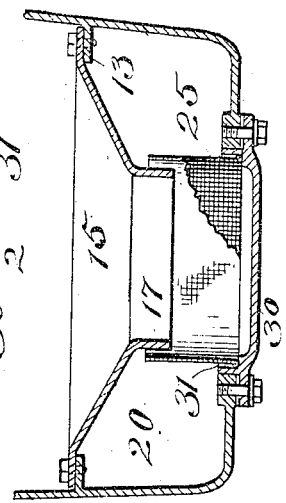
Inventor.
Frank H. Farmer
By Thurston & Rivis
attys.

UNITED STATES PATENT OFFICE.

FRANK H. FARMER, OF CLEVELAND, OHIO, ASSIGNOR TO THE WHITE MOTOR COMPANY, OF CLEVELAND, OHIO, A CORPORATION OF OHIO.

INTERNAL-COMBUSTION ENGINE.

1,230,470.      Specification of Letters Patent.      Patented June 19, 1917.

Application filed November 9, 1916. Serial No. 130,317.

*To all whom it may concern:*

Be it known that I, FRANK H. FARMER, a citizen of the United States, residing at Cleveland, in the county of Cuyahoga and State of Ohio, have invented a certain new and useful Improvement in Internal-Combustion Engines, of which the following is a full, clear, and exact description.

In internal combustion engines, it is common practice to pump oil from an oil reservoir to various bearings of the crank shaft and connecting rods; and to provide a crank case into which the excess oil from said bearings will drip; and to provide an oil passage through which oil from the crank case may flow back into the oil reservoir. It is likewise common practice to employ in connection with this oil circulating system an oil strainer through which the oil must pass after it has dripped from the bearings and before it is again drawn into the pump.

It is of common occurrence, in constructions of this sort, for the strainers to become so clogged up by the dirt in the oil, that they will no longer permit the oil to flow through. The result will be that the pump will cease to supply the bearings with oil either because the oil can not return to the oil reservoir or can not flow from the oil reservoir to the pump.

When this happens the operator of the engine, or generally the driver of the automobile of which the engine is a part, will not know of this condition until his attention is called to it by some obvious injury to the bearings which have been so deprived of necessary lubrication.

The object of this invention is to provide a strainer which will operate as such so long as it does not become clogged up, but which after it has become clogged up will not interfere with the flow of the unstrained oil.

The invention consists in the construction and combination of parts shown in the drawing and hereinafter described, and pointed out definitely in the appended claims.

In the drawing, Figure 1 is a longitudinal vertical section of the lower part of the crank case of an internal combustion engine; Fig. 2 is a transverse vertical section of the lower part of said crank case in the plane indicated by 2—2 on Fig. 1.

Referring to the parts by reference characters, 10 represents the lower part of the crank case of a four-cylinder internal combustion engine. Within this crank case is an approximately horizontal partition 15, which at its edges rests upon and is secured to the flanges 13 which project inward from the side and end walls of said crank case.

This partition while approximately horizontal, is nevertheless dish-shaped, and, at its lowest point, there is a hole 16 surrounded by a downturned flange 17. It will be understood by those familiar with this art that oil from the cylinders and from various bearings will drip into the crank case onto this partition, and will flow down through the hole 16 into the oil receptacle 20 between this partition and the bottom of the crank case; and it will be likewise understood that it is from this oil receptacle 20 that the oil is withdrawn through such a pipe as 18 by a pump or other suitable means, which are not shown, and discharged through such a pipe as 19, to the bearings of the crank shaft, and connecting rods, which in turn drips as stated into the crank case upon the partition 15.

An upright tubular strainer 25, made of wire mesh or some equivalent material, rests upon the bottom of the crank case, and extends upward around the flange 17, but not into contact therewith or with the partition 15. It is evident therefore that the oil which flows through the hole 16 will flow into this strainer tube, and that it will flow through the mesh of this strainer into the oil reservoir 20, and that the strainer will prevent the passage of much of the dirt with which the oil has become contaminated by use.

It is to be noted, therefore, that, in the construction shown in the drawing, this strainer tube while it makes a tight joint at its bottom with the bottom of the crank case does not contact at its upper edge with anything. This upper edge is, however, above the normal and expected level of the oil in the crank case, wherefore so long as said strainer does not become clogged the oil will, of course, pass through it. If, however, the strainer does get so clogged with dirt that the oil can not pass through it as fast as it is delivered to it, the oil will accumulate within this strainer tube, and will eventually flow over the top thereof into the oil reservoir. Of course, the oil which does so flow will not be strained oil, wherefore it is not desirable that, normally, the oil shall flow over the top thereof. But oil which is not strained is much better than no oil at all, and therefore the construction insures that there shall always be an adequate supply of oil in the oil reservoir to serve the purposes for which said oil is provided, and it insures also that this oil shall be strained so long as the strainer remains operative.

While the statement has been made that the lower end of the strainer tube rests upon and forms a tight joint with the bottom of the crank case it should be noted that the part of the bottom with which the strainer does so engage is a removable cap 30 which is secured over a hole in the bottom of the crank case by means of bolts. There is a recess 31 in the inner face of this cap into which the lower end of the strainer fits. It is therefore an easy matter to periodically take off this cap, and to, at the same time, remove the strainer for the purpose of cleaning it. It is easy then to replace it in operative position by merely replacing the cap 30.

Having described my invention, I claim:

1. In an internal combustion engine, the combination of a crank case into which the oil will drop from the bearings of the crank shaft and connecting rods, which crank case has an oil discharge opening, an oil receptacle into which said oil opening discharges oil and from which oil may be withdrawn by a pump and delivered to the bearings of the crank shaft and connecting rods, and an upright strainer tube which has a closed lower end and an open upper end and which is located in such position that the oil in following the above described path is at some time delivered into the open end of said strainer and may flow from said strainer either through the meshes thereof or over the top thereof into the adjacent part of the oil circulating path.

2. In an internal combustion engine, the combination of a crank case into which oil will drip from the bearings of the crank shaft and connecting rods,—which crank case has an oil discharge opening, an oil receptacle, and an upright strainer tube which has a closed lower end and an open upper end, and which is located within the oil receptacle in position to receive into its open upper end the oil discharged from the crank case through oil discharge openings thereof.

3. In an internal combustion engine, the combination of a crank case into which oil will drip from the bearings of the crank shaft and connecting rods,—which crank case has an oil discharge opening, an oil receptacle in the bottom of said crank case having an opening through its bottom directly below the oil discharge opening of the crank case, a cap removably secured over the opening in the bottom of the oil receptacle which cap has a recess in its upper surface, and a strainer tube whose lower end is fitted into said recess and whose upper end is below the oil discharge opening from the crank case.

4. In an internal combustion engine, a crank case having inwardly directed flanges along its end and side walls, a partition which rests upon and is secured to said flanges which separates the crank case proper from an oil reservoir below the same,—said partition having a hole surrounded by an annular flange and being dished downward toward that hole, and a strainer tube fixed to the bottom of the crank case and projecting up around said annular flange but out of contact with it and with said partition.

In testimony whereof, I hereunto affix my signature in the presence of two witnesses.

FRANK H. FARMER.

Witnesses:
H. C. McGOEY,
H. G. COLLINS.